Feb. 6, 1923.
W. W. WYNNE.
CONVERTIBLE COASTER AND SCOOTER.
ORIGINAL FILED AUG. 14, 1920.
1,444,295
3 SHEETS-SHEET 1
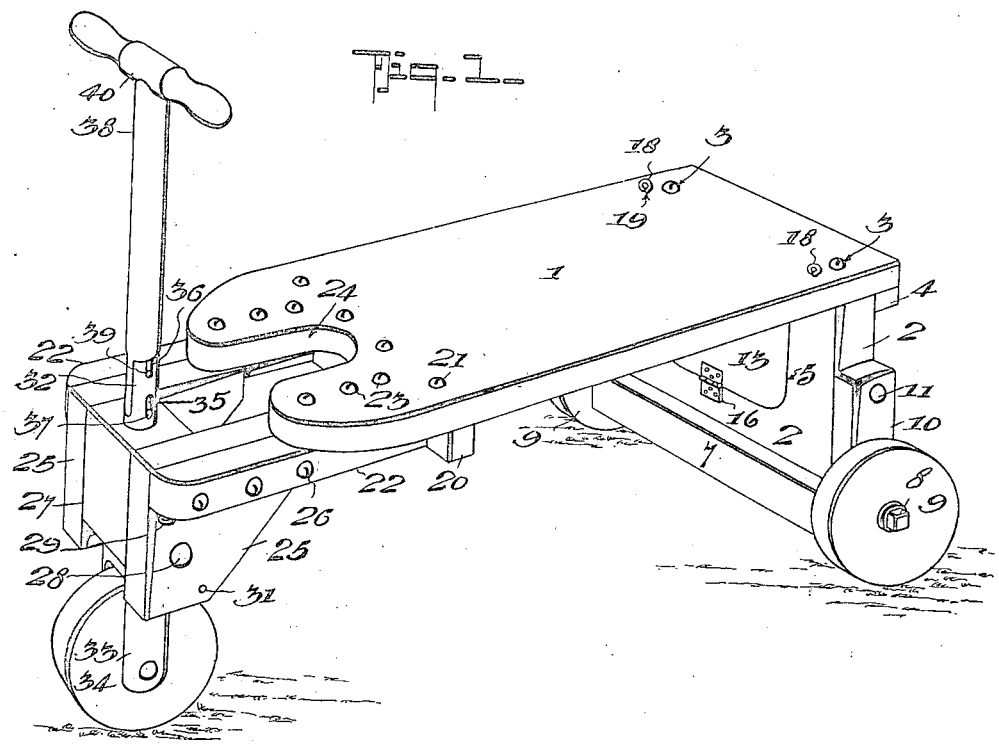
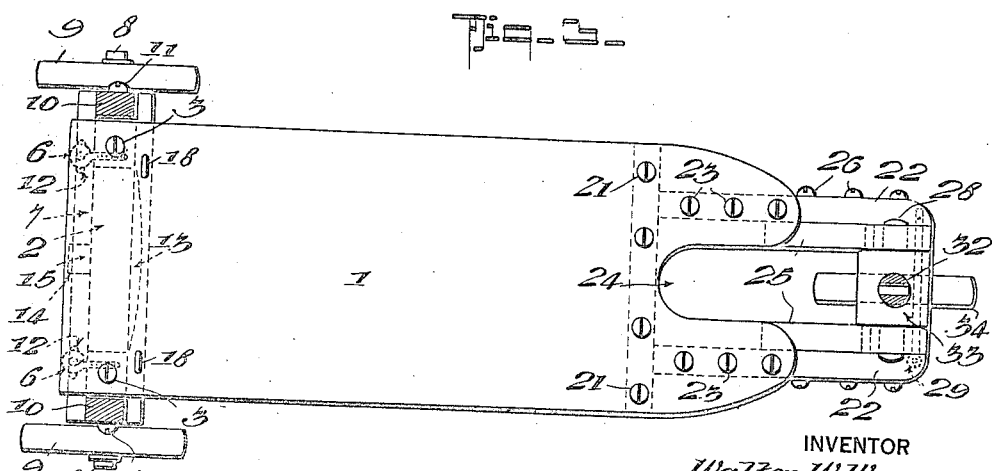
INVENTOR
Walter W. Wynne,
BY
Fred G. Dieterich
ATTORNEYS

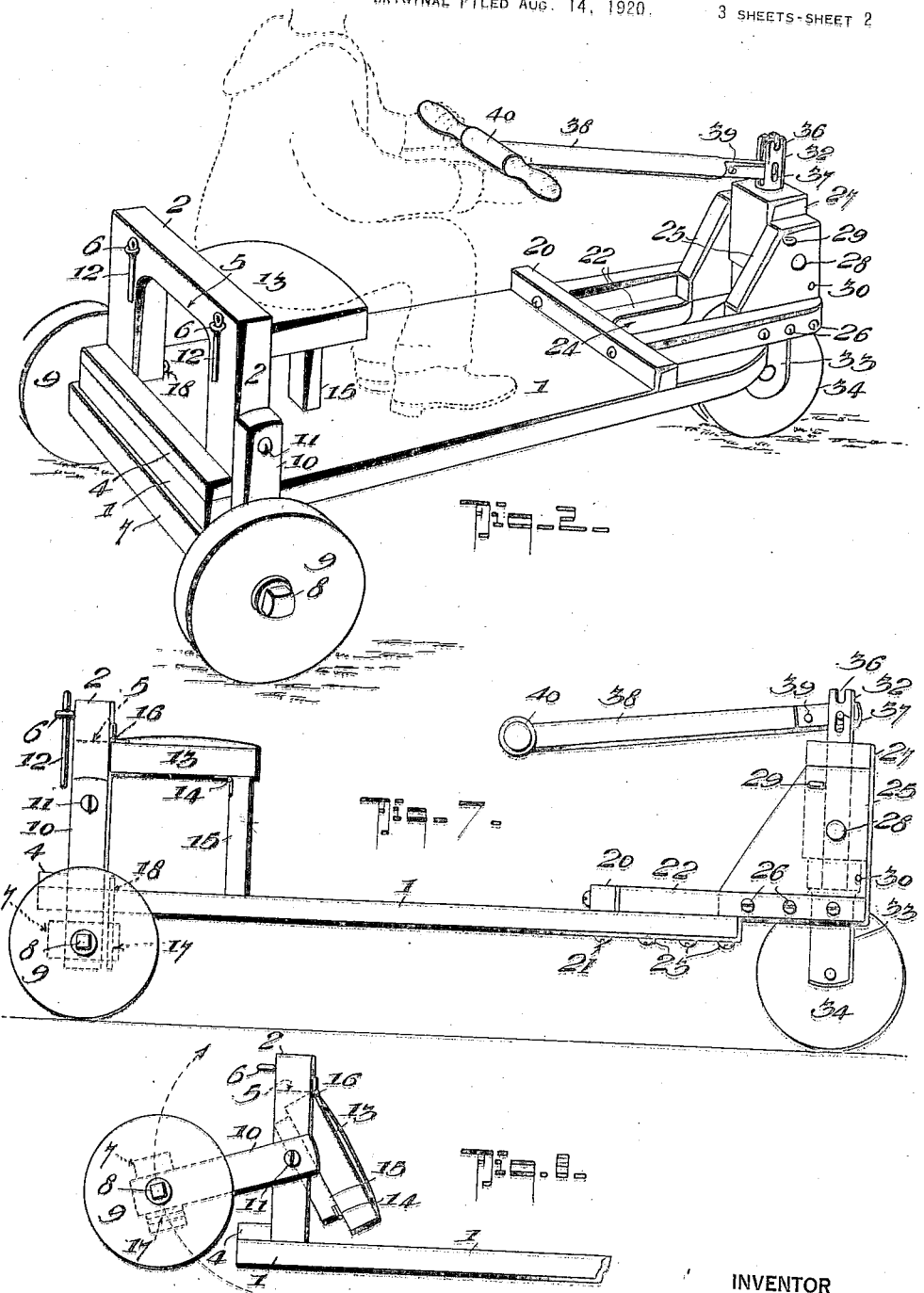

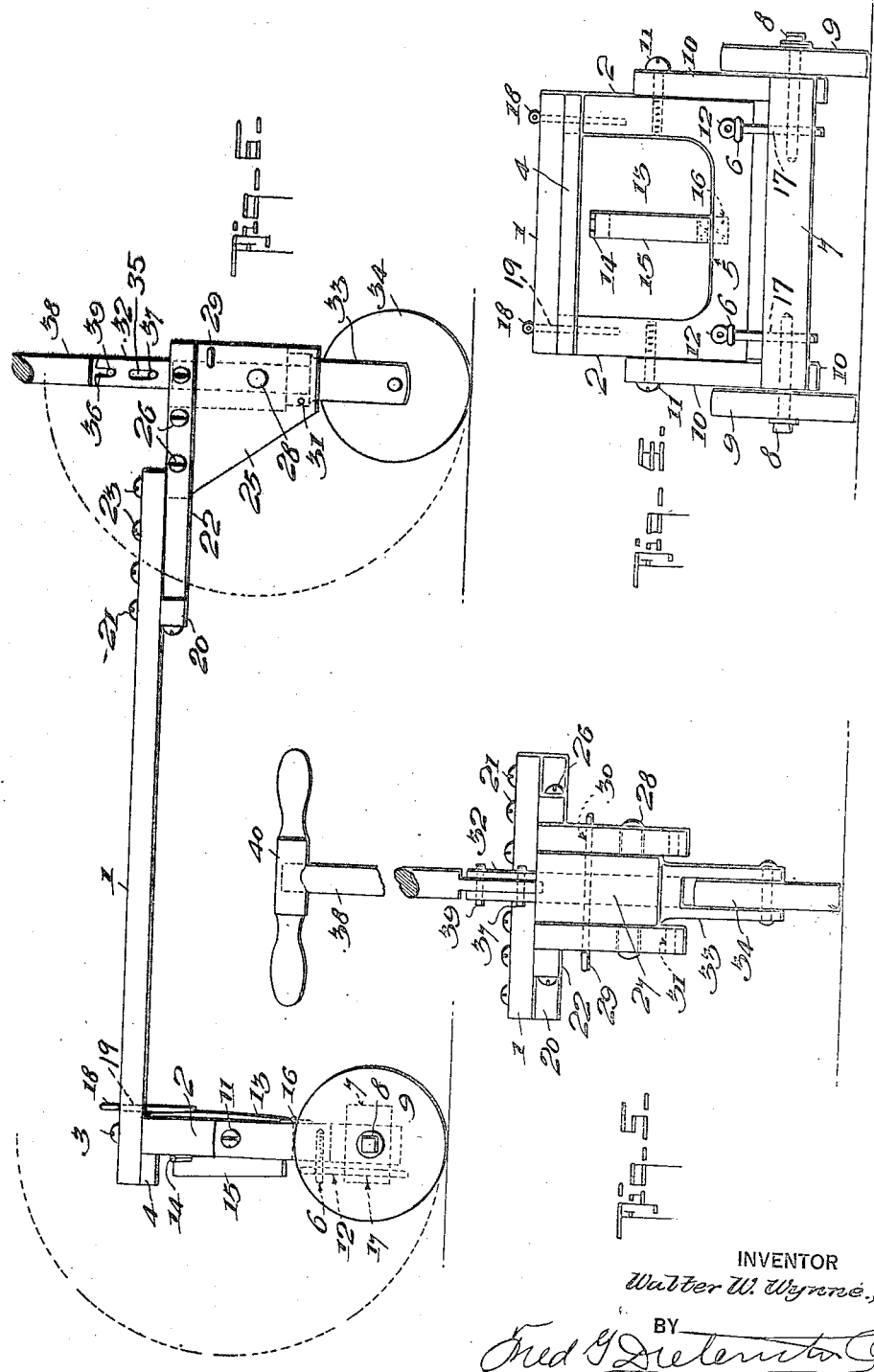

Patented Feb. 6, 1923.

1,444,295

UNITED STATES PATENT OFFICE.

WALTER WILLIAMS WYNNE, OF EAU CLAIRE, WISCONSIN.

CONVERTIBLE COASTER AND SCOOTER.

Application filed August 14, 1920, Serial No. 403,604. Renewed May 19, 1922. Serial No. 562,263.

*To all whom it may concern:*

Be it known that I, WALTER WILLIAMS WYNNE, a citizen of Great Britain, residing at Eau Claire, in the county of Eau Claire and State of Wisconsin, have invented certain new and useful Improvements in Convertible Coasters and Scooters, of which the following is a specification.

My inventon has for its object to provide a vehicle capable of being used as a coaster or as a scooter.

A coaster is built with the seat body fairly high above the wheels and is propelled by one foot bearing on the ground, while the knee of the other leg rests on the seat body; while a scooter is a vehicle having the seat body below the top of the wheels and fairly low so as to be propelled by one foot touching the ground, while the other foot rests on the seat body.

My invention primarily has for its object to provide in a single vehicle a structure of such design and cooperative combination of parts that it may be adapted, by a slight adjustment, for use either as a coaster or as a scooter at the will of the user.

In its generic nature, my invention comprises a body having provision at its forward end for sustaining the steering wheel and having provision, at its rear end, for mounting upon the axle of the rear wheels, reversible elements connecting the body with the rear wheel axle, whereby the body may be located a considerable distance above the tops of the wheels, when it is desired to use the vehicle as a coaster or the vehicle body may be located below the tops of the wheels, when it is desired to use the vehicle as a scooter.

The invention also has for its object to provide a foldable seat that may be used in the scooter position and which is designed normally to fit snugly into the rear support of the body, when the vehicle is used as a coaster, the foldable seat serving as a back rest, when the scooter is running down an incline.

Again, the invention has for its object to provide an improved construction of steering mechanism so arranged that the steering wheel spindle bearing may be reversed to enable the vehicle to be used either as a coaster or as a scooter, with provision for holding the steering handle vertically, when desired.

The invention furthermore resides in those novel features of construction, combination and arrangement of parts, all of which will be first fully described and then be specifically pointed out in the appended claims, reference being had to the accompanying drawings, in which:

Figure 1 is a perspective view of the invention in use as a coaster.

Figure 2 is a perspective view of the invention in use as a scooter.

Figure 3 is a top plan of the vehicle in the coaster position.

Figure 4 is a rear elevation of the same.

Figure 5 is a front elevation of the same.

Figure 6 is a side elevation of the same.

Figure 7 is a side elevation of the vehicle with the parts in the scooter position.

Figure 8 is a diagrammatic side elevation of the rear part of the vehicle.

In the drawings in which like numerals of reference indicate like parts in all of the figures, 1 represents the body of the vehicle, to the rear of which is secured a cross cleat 4 and a support 2, the latter being fastened to the body 1 by screws 3, when the support 2 is made as a separate part from the body 1.

The support 2 has a portion removed, as at 5, to form a seat socket into which the seat 13 may fold, when the vehicle is used as a coaster or, at other times, when the use of the seat 13 is not desired.

The support 2 is provided with eyes 6 to receive the cotter pins 12 which are adapted to be projected through the eyes 6 and through holes 17 in the axle bolster 7.

The rear wheels 9 are mounted on studs 8 screwed into or otherwise mounted on the axle bolster 7.

10 indicates standards which are rigidly secured to the bolster 7 and project upwardly from the same and carry the pivot screws 11 which form a fulcrum for the support 2 on the standards 10 for a purpose presently explained.

The seat 13 is formed to fit in the opening 5 of the support 2 and is hinged at 16 to the support. It is also provided with a leg 15 that is hinged to it, as at 14, and may be folded up parallel, as indicated in Figures 4 and 6 of the drawings.

Other cotter pins 18 passing through holes in the body 1 assist the cotter pins 12 in holding the support 2 parallel with the standards 10, when the vehicle is being used as a coaster.

At the front of the body 1, the body is bifurcated, as at 24, and to the rear of the bifurcation is provided a cross cleat 20 and, at each side of the opening, is provided longitudinal cleats 22, the cleats 20 and 22 being fastened by screws 21 and 23, or in any other suitable way, rigidly to the body 1.

25 designates bearing blocks or plates secured to the cleats 22 by screws 26 or in any other suitable way, and provided with bearing apertures 4 the trunnions 28 of the steering bearing block 27, the block 27 being held in either of its vertical positions by a cotter pin 29, which is designed to be passed through the apertures for the trunnions 28 of the steering 25, as clearly indicated in Figures 6 and 7 of the drawings.

32 is the caster wheel spindle which is mounted in a bearing aperture in the block 27 and at its lower end is suitably secured to the fork 33 that carries the caster or steering wheel 34.

The spindle 32 is slotted at 35 and bifurcated, at its upper end, to receive the ends of the steering post 38, the latter having a pin 37 held in the slots 35 to secure the post 38 to the spindle 32 and in order that the post 38 may be held in the vertical position, it is provided with a second pin 39, while the post 32 is slotted at 36 to receive the pin 39.

When the parts are positioned as shown in Figure 6, the post 38 will be held vertical, while, when in the position shown in Figure 7, it may be inclined, at any desired angle.

40 is the handle carried by the steering post 38 through the medium of which the wheel 34 is manipulated.

Assuming the parts to be positioned for use as a coaster (see Figures 1 and 3 to 6, inclusive) and it is desired to convert the vehicle into a scooter, the user by removing the pin 29 from the pin hole 30 will be able to swing the wheel 34 through the opening 24 one hundred and eighty degrees and then by placing the pin 29 in the holes 31, the block 27 will again be fastened rigidly in a vertical position.

The pins 12 and 18 are also removed and the axle 7 swung on the axis of the screws 11 through one hundred and eighty degrees, whereupon the pins 18 are inserted through the holes 19 and 17 to secure the parts in the reverse position.

The body 1 will then lie close to the axis of the vehicle, as shown in Figure 7, instead of a considerable distance above the same, as shown in Figure 1, thus adapting the vehicle as a scooter.

If it is desired to use the seat 13, it is swung out from its recess 5 and the leg 15 dropped down, as indicated in Figure 2.

To convert the vehicle from a scooter to a coaster, the foregoing manipulations are reversed.

I desire it understood that the drawing illustrates the preferred embodiment of the invention, when the same is constructed of wood, although I wish it understood that any material desired may be employed in its construction and I also wish it understood that the form or design of the vehicle as such constitutes no part of the present application, as changes in the design form and appearance of the vehicle can be made without departing from the spirit of the present invention or the scope of the appended claims.

What I claim is:

1. In a vehicle of the class described, a body, members mounted on said body and projected in a direction normal to the plane of the body, front and rear wheeled elements pivotally mounted on said members and adapted to be swung on their pivots to locate the wheels either above or below the body, and means for holding said wheeled elements in position above or below the body according to the position desired.

2. A vehicle of the class described comprising a body, one end of which is slotted, a bearing member having trunnions pivotally mounted at the front of the body, a steering wheel having a spindle rotatably mounted in said pivoted bearing member and adapted to be swung through the slot of the body and means for holding said pivoted bearing member in its different positions of adjustment, and a wheeled element mounted at the other end of said body and adapted to be positioned with the axes of the wheels either above or below the plane of the body.

3. A vehicle of the class described comprising a body, a support rigidly secured to said body, near one end, and projecting in a plane at an angle to the plane of the body, a wheeled axle, standards carried by said axle and pivotally mounted on said support, whereby said wheeled axle may be swung on the pivot to locate the axle either above or below the plane of the body, means for holding the wheeled axle in position either above or below the plane of the body, and another wheeled structure at the other end of the body including pivoted elements, whereby said other wheeled structure may be reversed to correspond with the positions of the first mentioned wheeled structure, substantially as shown and for the purposes described.

4. In a vehicle of the class described, a body, a support rigidly secured to said body and projected in a plane normal thereto, a wheeled axle, standards carried by the said axle and pivotally connected to said support, means for holding said wheeled axle in fixed relation to said support with the axle located either above or below the plane of the body, substantially as shown and described.

5. In a vehicle of the class described, a body, a support rigidly secured to said body and projected in a plane normal thereto, a wheeled axle, standards carried by the said axle and pivotally connected to said support, means for holding said wheeled axle in fixed relation to said support with the axle located either above or below the plane of the body, said support having a seat receiving recess, a seat foldable into said recess and hingedly connected with said support, said seat adapted to be unfolded, and means for bracing said seat from said body, when the seat is unfolded.

6. In a vehicle of the class described, a body, a support rigidly secured to said body and projected in a plane normal thereto, a wheeled axle, standards carried by the said axle and pivotally connected to said support, means for holding said wheeled axle in fixed relation to said support with the axle located either above or below the plane of the body, said last named means comprising fastening pins, said axle having pin holes for receiving said fastening pins.

7. In a vehicle of the class described, a body, cleats extending from the end of said body, fixed bearing blocks secured to said cleats, a steering bearing block pivotally mounted on and between said blocks, a steering wheel spindle mounted in said steering bearing block, a wheel carried by said spindle and a steering post and handle connected with said spindle, and means for holding said steering bearing block in reversible connection with said fixed bearing blocks.

8. In a vehicle of the class described, a body, fixed members projected from said body at the front and rear thereof, reversible wheeled elements mounted on the respective fixed members and adapted to locate the axes of the wheels either above or below the plane of the body, one of said wheeled elements including a steering spindle, a steering post hinged to said spindle and means for holding said steering post in longitudinal alignment with said spindle at times.

9. In a vehicle of the class described, a body, fixed members projected from said body at the front and rear thereof, reversible wheeled elements mounted on the respective fixed members and adapted to locate the axes of the wheels either above or below the plane of the body, one of said wheeled elements including a steering spindle, a steering post hinged to said spindle and means for holding said steering post in longitudinal alignment with said spindle at times, said last named means comprising a shiftable pin and slot pivotal connection between said steering post and spindle, and a second pin and slot connection between the same parts for restraining the pivotal movement.

10. In a vehicle of the class described, a body, members secured to said body, and projected in a direction normal to the plane of the body, front and rear wheel carrying elements horizontally pivotally mounted on said members, said elements being of a length whereby they may be swung on their pivots through an arc of a half circle to locate the wheels either above or below the body, and means for holding said elements in position with the wheels located above or below the body according to the position desired.

WALTER WILLIAMS WYNNE.